(No Model.)  2 Sheets—Sheet 1.

W. E. LINDSLEY.
WATER OR FLUSH TANK FOR WATER CLOSETS, &c.

No. 340,226.  Patented Apr. 20, 1886.

(No Model.) 2 Sheets—Sheet 2.

W. E. LINDSLEY.
WATER OR FLUSH TANK FOR WATER CLOSETS, &c.

No. 340,226. Patented Apr. 20, 1886.

WITNESSES:
Geo. R. Byington
Gomer Jones

INVENTOR
Wm E. Lindsley

By S. J. Van Stavoren
ATTORNEY

UNITED STATES PATENT OFFICE.

WILLIAM E. LINDSLEY, OF PHILADELPHIA, PENNSYLVANIA.

WATER OR FLUSH TANK FOR WATER-CLOSETS, &c.

SPECIFICATION forming part of Letters Patent No. 340,226, dated April 20, 1886.

Application filed June 9, 1885. Serial No. 168,135. (No model.)

*To all whom it may concern:*

Be it known that I, WILLIAM E. LINDSLEY, a citizen of the United States, residing at Philadelphia, in the county of Philadelphia and State of Pennsylvania, have invented certain new and useful Improvements in Water or Flush Tanks for Water-Closets and other Fixtures, of which the following is a specification, reference being had therein to the accompanying drawings, wherein—

Figure 1:
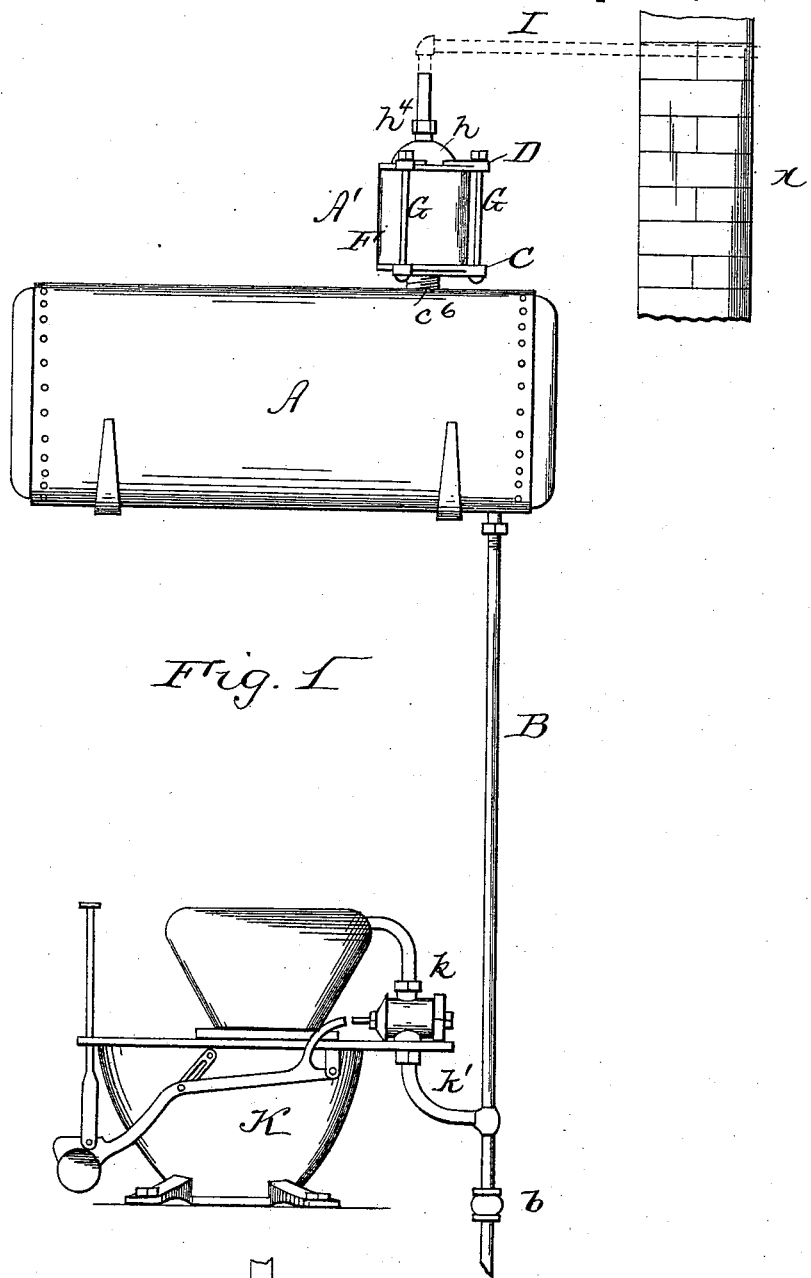
Figure 2:
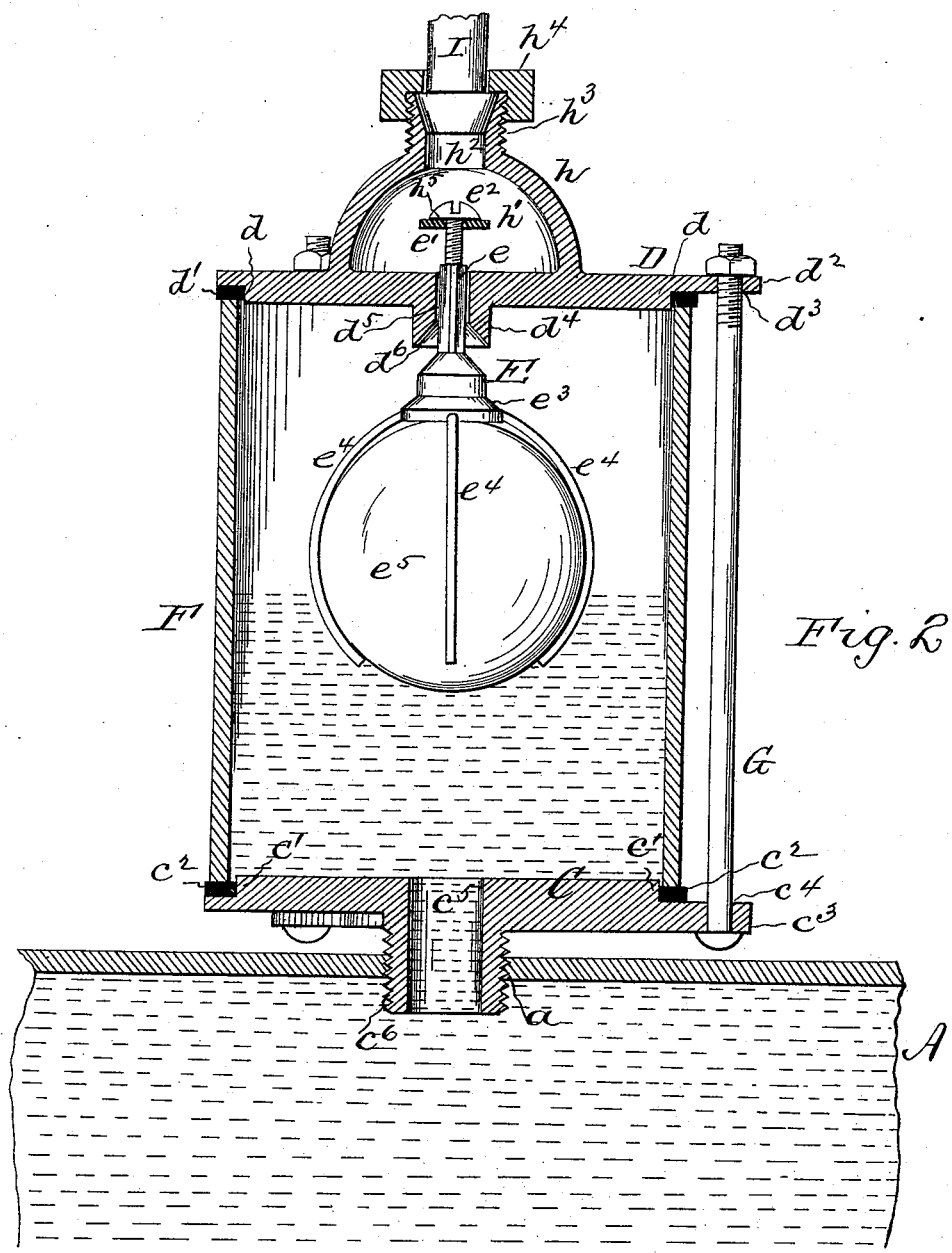

Figure 1 is an elevation of a flushing tank or reservoir and service-pipe embodying my improvements, and showing the application of a water-closet thereto. Fig. 2 is a vertical section, partly in elevation, of the overflow float-valve and casing and part of the flush-tank, drawn to an enlarged scale. Fig. 3 is a detail vertical section of check-valve in supply-pipe for the flush-tank.

My invention has relation to that class of water-closet or other flush tanks or reservoirs having an overflow or float-valve attachment for automatically closing the air vent or pipe of the tank when it is filled, and which in like manner opens said vent or pipe as the tank is emptied; and it has for its object simplicity of construction of parts, as hereinafter described and claimed.

In the drawings, A represents a tank or reservoir, having a supply or service pipe, B.

A' indicates the overflow float-valve attachment, composed of top and bottom plates, D and C, float-valve E, tubular body F, and fastening-rods G.

The bottom plate, C, is formed with a shoulder, $c'$, on its upper side for the reception of a gasket, $c^2$, edge lugs, $c^3$, radially arranged, having openings $c^4$, and a central opening, $c^5$, terminating in a threaded nozzle, $c^6$, which screws into an opening, $a$, in the top of the tank A.

The top plate, D, is formed with a shoulder, $d$, on its under side, to receive a gasket, $d'$, side or edge lugs, $d^2$, radially arranged, and having openings $d^3$, to register or align with the openings $c^4$ in lugs $c^3$ on plate C, a chamber, $h$, on its upper side, in which is a bridge, $h'$, and having outlet-opening $h^2$, which is exteriorly threaded at $h^3$ to receive a coupling, $h^4$, of a pipe, I. The latter may lead to a chimney or wall, $x$, (see Fig. 1,) or elsewhere, as desired, and it forms an air-pipe for the attachment A' and tank A.

In the center of plate D, upon its lower side, is a teat or stud, $d^4$, having an opening, $d^5$, which leads into chamber $h$, to form a communication between air-pipe I and tank A. The lower end of opening $d^5$ in stud $d^4$ is bored out dish shape, or made conical, to form a seat, $d^6$, for a correspondingly-shaped valve, E, secured or provided with a stem, $e$, fluted on its outside and passing upward through opening $d^5$. To the top of stem $e$ connects a screw, $e'$, which passes through opening $h^5$ in bridge $h'$. The head $e^2$ of screw $e'$ rests upon the bridge $h'$, as shown in Fig. 2, to hold valve E in a suspended condition when off its seat.

Valve E is preferably made with a bottom plate or flange, $e^3$, in which are inserted a number of downwardly-projecting flexible rods or wires, $e^4$, which are adapted to bend around a glass or other ball, $e^5$, as shown, to secure it to valve E, said ball serving as a float for the valve.

The body F for the attachment A' is made of glass or other material, as desired, and is inserted between the plates C D, its edges contacting with and sinking into the gaskets $c^2$ $d'$, to form tight joints therewith when it and the plates are connected together by the bolt-rods G, passing through the openings $c^4$ $d^3$ in lugs $c^3$ $d^2$ of the plates C D, respectively.

The float-valve attachment A' prevents overflow from the tank, for as soon as it is filled the water or liquid passing into body or chamber F rises therein until it reaches the ball or float $e^5$, when it ascends and elevates or moves valve E to its seat $d^6$, to close the outlet-opening $d^5$ in top plate, D, or the passage to the vent-pipe I. As soon as the water in tank is used or drawn off, the float and valve drop and unseal outlet $d^5$, to restore communication between the tank and vent-pipe, to admit air to the former as the water is escaping from the same.

To prevent backflow from the tank, its pipe B is provided with a check-valve, $b$, at or near its end, or in advance of a pipe-connection therewith, said check-valve being shown more plainly in Fig. 3.

The tank, with its attachment, serves for a flush-tank for water-closets or other fixtures, as indicated at K in Fig. 1, in which case the valve $k$ of the closet has a pipe-connection, $k'$, with the pipe B. Upon opening the closet-valve $k$ the water from tank A passes to and flushes the closet-bowl, the check-valve $b$ meanwhile closing while the flushing takes place.

The foregoing-described construction of parts, it will be noted, provides a service-pipe and closet-connection for a tank float-valve attachment, the parts of which are separable from one another, so that repairs or replacement of broken parts can be easily and inexpensively accomplished. The tank is always filled without overflowing, and when filled backflow therefrom is avoided, and a body of water is always ready to be immediately drawn from said tank.

What I claim is—

1. A detachable overflow attachment for flushing tanks or reservoirs, composed of separable top and bottom plates, a tubular body, a float-valve having a loose or sliding connection with a bridge formed in a chamber on said top plate, a vent-pipe for said chamber, and screw-bolts for securing said plates and body together, substantially as shown and described.

2. A flush-tank attachment, A′, composed of plate C, having screw-nozzle $c^6$, shoulder $c'$, gasket or packing $c^2$, and bolt-holes $c^4$, tubular body F, plate D, having central opening, $d^5$, valve-seat $d^6$, shoulder $d$, gasket or packing $d'$, bolt-holes $d^3$, and chamber $h$, having vent-pipe I, and bridge $h'$, with opening $h^5$, the valve E, having screw-connection $e'$, with bridge $h'$, float $e^5$, and fastening-wires $e^4$, and bolts G, for securing said parts in position relatively to one another, substantially as shown and described.

3. In combination with tank A, having float-valve attachment A′, a single service or an inlet and outlet pipe, B, having check-valve $b$, and a valved branch pipe, $k'$, above said check-valve, substantially as shown and described.

In testimony whereof I affix my signature in presence of two witnesses.

WILLIAM E. LINDSLEY.

Witnesses:
S. J. VAN STAVOREN,
CHAS. F. VAN HORN.